United States Patent [19]

Schoonover

[11] 3,744,857

[45] July 10, 1973

[54] TRACK MOUNTING AND TENSIONING ASSEMBLY FOR TRACKED VEHICLES

[75] Inventor: Richard H. A. Schoonover, West Linn, Oreg.

[73] Assignee: Formac International, Inc., Seattle, Wash.

[22] Filed: Apr. 26, 1971

[21] Appl. No.: 137,454

[52] U.S. Cl. .................................... 305/10, 180/9.5
[51] Int. Cl. ............................................ B62d 55/30
[58] Field of Search ................... 180/9.5, 9.52, 9.64, 180/9.62, 9.2, 9.56, 9.54, 10; 305/32, 31, 27, 22

[56] References Cited
UNITED STATES PATENTS

| | | | |
|---|---|---|---|
| 3,182,741 | 5/1965 | Roach............................... | 180/9.5 |
| 3,447,620 | 6/1969 | Schoonover................... | 180/9.64 X |
| 2,284,821 | 6/1942 | Heaslet............................. | 305/31 X |
| 3,446,302 | 5/1969 | Schoonover..................... | 305/10 X |
| 3,343,832 | 9/1967 | Gustafsson.......................... | 305/27 |

*Primary Examiner*—Richard J. Johnson
*Attorney*—Christensen & Sanborn

[57] ABSTRACT

A track mounting and tensioning assembly for track-type tractors and other tracked vehicles includes an endless sprocket-driven track, and a walking beam-bogey wheel assembly engaging the track. The walking beam-bogey wheel assembly is supported on a vertical lever pivotally connected intermediate its ends to the frame of the vehicle. The lower end of the lever is pivotally connected to an intermediate point on the walking beam. The upper end of the lever is pivotally connected to power means such as a fluid operated cylinder which applies pressure to the lever in the direction of track tensioning. The bogey wheels themselves thus become the tensioning instrumentalities which maintain the track under constant tension despite track length changes which normally occur during operation of tracked vehicles over rough terrain.

11 Claims, 7 Drawing Figures

PATENTED JUL 10 1973 3,744,857

Richard H. A. Schoonover
INVENTOR
BY Eugene D. Farley
Atty.

Richard H. A. Schoonover
INVENTOR

TRACK MOUNTING AND TENSIONING ASSEMBLY FOR TRACKED VEHICLES

This invention relates to track mounting and tensioning assemblies for tracked vehicles.

As is well known, the tracks of a track-laying vehicle lengthen and shorten with bogey wheel position changes during operation of the vehicle over rough terrain. This decreases the track drive efficiency, increases wear on component parts and may even loosen the track sufficiently to cause its demounting from the drive sprockets and bogeys.

The problem customarily is overcome by the application of spring loaded track tensioners mounted within the track assembly itself.

Serious problems attend the operation of track tensioners of the foregoing class. Since they are located inside the track assembly, the spring components load with mud, bolt threads rust and mud plugs the entire system. Debris, mud and snow build up on top of the tensioning assembly, adding weight to the vehicle, freezing up and breaking loose in chunks. Upon passing the sprockets and bogeys, the chunks put excess tension on the tracks, and even may arrest the motion of the vehicle or cause the loss of a track.

In addition, the conventional tensioning devices do not provide sufficient travel to make possible easy removal of track sprockets or bogeys; are difficult of access; and are difficult to remove and/or assemble. Still further, the manner of application of the spring loaded tensioners is such that when the vehicle is thrown into reverse, the tensioning effect of the spring is cancelled, loosening the track.

It is the general purpose of the present invention to provide a track mounting and tensioning assembly for tracked vehicles which overcomes the foregoing problems by applying uniform and optimum tension to the tracks of tracked vehicles under all conditions of operation; which tensions the track whether the vehicle is progressing forwardly or in reverse; which is located out of the mud and water in which the vehicle operates and hence is not susceptible to becoming clogged; which may be adjusted to apply fixed or variable tension as described; which is easily assembled and installed; which provides sufficient travel for tensioning under extreme conditions as well as for track removal; and which is applicable to tracked vehicles of various classes, including articulated four-tracked vehicles having limited space for mounting the tensioning assembly.

The manner in which the foregoing and other objects of this invention are accomplished will be apparent from the accompanying specification and claims considered together with the drawings, wherein:

Figure 2:
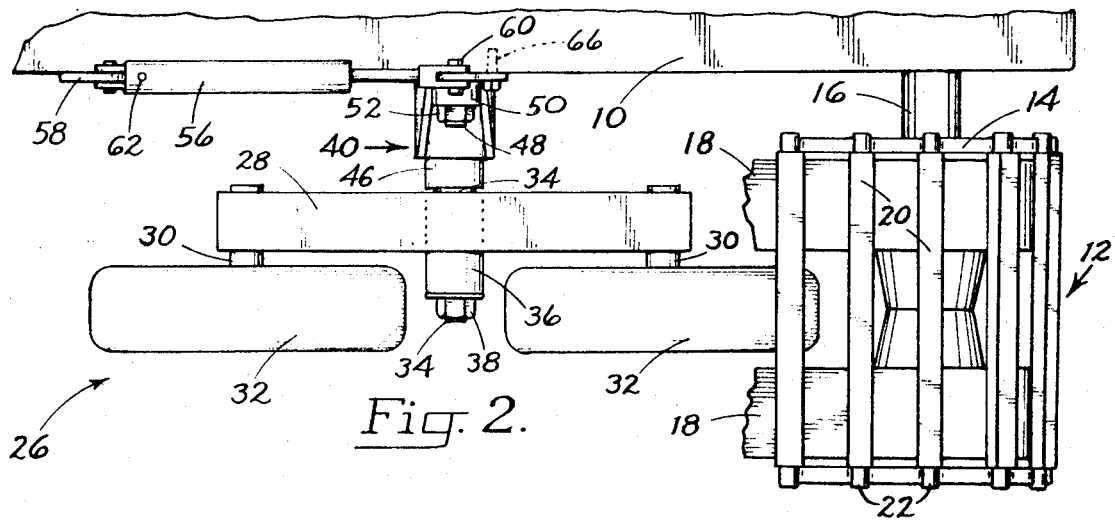
FIG. 2 is a fragmentary view in plan of the vehicle.

In its broad concept, the presently described track mounting and tensioning assembly for tracked vehicles comprises a sprocket-mounted endless track in combination with a walking beam-bogey wheel assembly engaging the track.

a lever is pivotally connected intermediate its ends to the vehicle frame, adjacent the track. The lower end of the lever is pivotally connected to and supports the walking beam assembly at a point intermediate the ends of the latter. Power means, for example, an hydraulic cylinder operated with hydraulic fluid under predetermined pressure is mounted on the vehicle and engages the upper end of the lever for applying pressure thereto. This pressure is transmitted through the lever to the bogey wheels, the position of which thereupon shifts with lengthening and shortening of the track as required to maintain the track under proper tension for optimum operation of the vehicle.

Considering the foregoing in greater detail and with particular reference to the drawings:

The tracked vehicle, the hull or frame of which is indicated at 10, is driven by cooperating, endless belted track assemblies, one suitable type of which is indicated generally at 12. Each assembly is of the double belt type driven by a pair of laterally spaced sprockets 14 fixed to a drive shaft 16. The shaft extends laterally outwardly from the hull of the vehicle and is connected to the vehicle motor.

Endless track 12 includes a pair of endless belts 18 which are interconnected by a plurality of grousers 20. These comprise bar type members which span the distance between the two belts and are bolted or otherwise secured thereto along the lengths of the track at spaced intervals.

The ends of the grousers are provided with longitudinally extending teeth or lugs 22. These mesh with sprockets 14 of the drive.

Wheel guides 24 extend inwardly from the central part of grousers 20. They receive and guide the support wheels (bogey wheels) with which the assembly is provided.

The bogey wheels are mounted on the walking beam assembly, indicated generally at 26. The assembly may be of conventional construction and includes a walking beam 28 which supports at each of its ends a shaft 30 on which rotatably is mounted a bogey wheel 32.

Walking beam 28 is pivotally mounted intermediate its ends on shaft 34 journaled in a bearing 36 and secured in position by means of a washer and nut 38.

The bogey wheel assembly supports and guides track 12 in the usual manner. In accordance with the present invention, however, it serves the additional function of tensioning the track. This is accomplished by mounting the walking beam assembly on tensioning means which adjust to differences in track length, thus applying tensioning pressure against the track.

Figure 1:
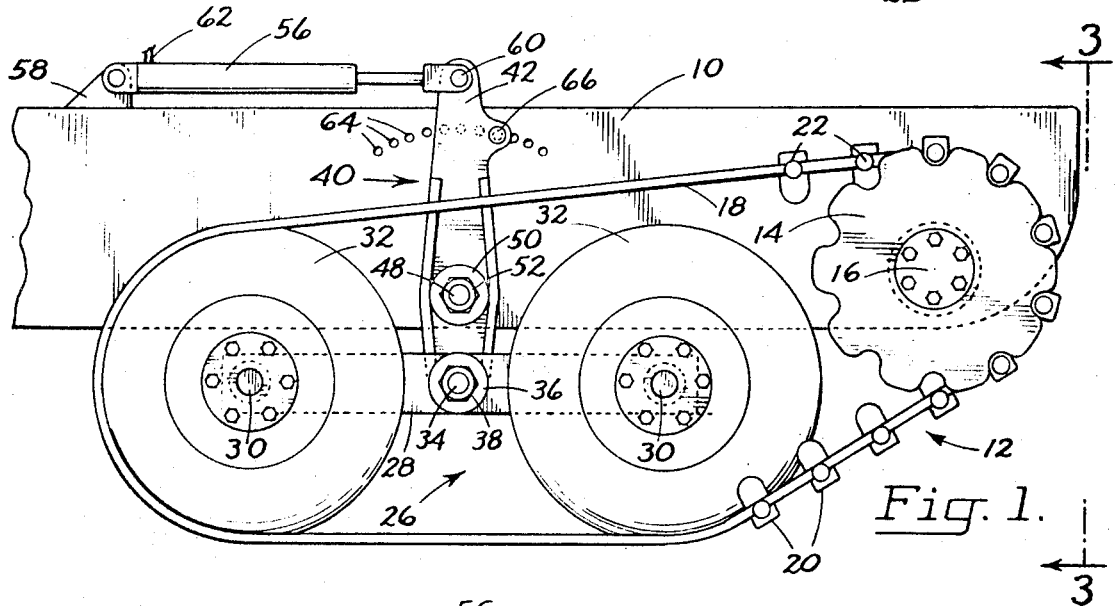
FIG. 1 is a fragmentary view in side elevation of a tracked vehicle including the herein described track mounting and tensioning assembly.
Figure 3:
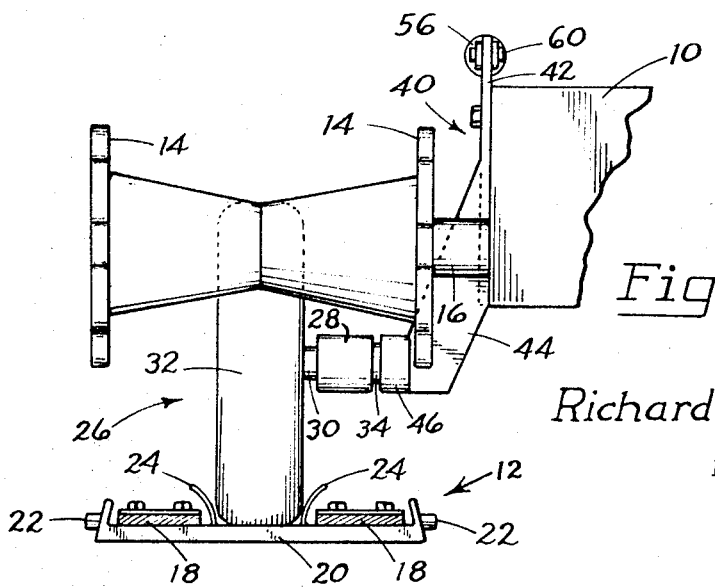
FIG. 3 is a fragmentary view in front elevation looking in the direction of the arrows 3—3 of FIG. 1.

In the FIGS. 1-3 embodiment of the invention, this result is accomplished by providing a vertically arranged lever 40 formed in two segments. These may be formed integrally, as by forging or casting, or as two interconnected parts.

The upper segment 42 comprises a flat plate which lies alongside frame 10. The lower segment 44 comprises an angular extension projecting downwardly and outwardly from the upper segment. The lower segment mounts at its lower end a bearing 46 which receives shaft 34 of the walking beam assembly.

Lever 40 is connected intermediate its ends to the frame of the vehicle. This is accomplished by providing a shaft 48 projecting laterally outwardly from the frame. The shaft is journaled in a bearing 50 supported by lever 40. A nut 52 maintains the lever demountably on the shaft.

Power means are connected to the upper end of lever 40 for applying pressure against the same and hence against the walking beam assembly. A spring loaded cylinder, an air cylinder, an hydraulic cylinder or a screw are examples of instrumentalities which may be employed for this purpose.

In the illustrated form of the invention, a single acting hydraulic cylinder 56 is mounted with its case pivoted to a fixed bracket 58 and its piston rod pivotally connected to the upper end of lever 40 by means of a pin 60. The single conduit 62 communicating with the cylinder behind the piston then may be connected to a source of hydralic fluid under pressure, as to the pump supplying hydraulic fluid to the steering circuit of the vehicle. The fluid pressure supplied to the cylinder is at a level predetermined to advance the piston of the cylinder when piston advancement is required to take up slack in the track, but to permit retraction of the piston when piston retraction is required to accommodate shortening of the track under the influence of outside forces.

Cylinder 56 thus applies resilient pressure continuously to the walking beam assembly. Means also are provided, however, for placing the walking beam assembly under a fixed tension. The means employed for this purpose is shown particularly in FIG. 1.

A plurality of radially spaced sockets 64 are provided in the side wall of frame 10 adjacent lever 40. These are disposed in an arc conforming to the radius of lever 42. A bolt or pin 66 is removably mounted in an opening through the upper segment 42 of the lever arm. This opening registers successively with various of sockets 64 as the lever sweeps through its arc. Accordingly the desired tension may be applied by cylinder 56 and lever 40 locked in a corresponding tension-applying position by inserting pin 66 in the particular one of sockets 64 with which it registers at the time.

When lever 40 is locked in this manner in a position of fixed tension, cylinder 56 may be entirely demounted and applied to secondary uses, such as providing a portable jack whenever there is need for such an implement in connection with the assembly, repair or operation of the vehicle.

Figure 4:
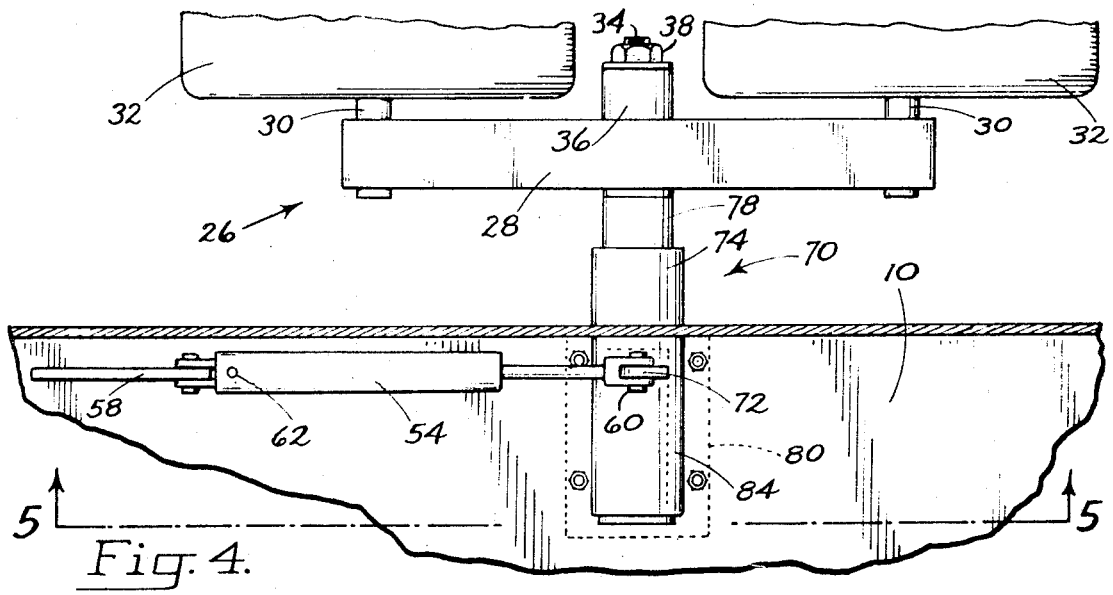
FIG. 4 is a fragmentary plan view of the herein described track mounting and tensioning assembly in an alternate embodiment.

It is to be noted particularly that the tensioning unit is mounted well above the tracks of the vehicle where it is free from fouling by mud, debris and water. Such fouling may be minimized even further by employing the embodiment of the tensioning unit illustrated in FIGS. 4–6, inclusive.

The tensioning unit of the latter figures is mounted within the hull of the vehicle where it is completely protected.

This result is made possible by the employment of a lever 70 provided in three segments: an upper segment 72, a lower segment 74 and an interconnecting shaft 76.

Upper lever segment 72 comprises a flat bar of heavy construction calculated to withstand the thrust applied to it. Additional thrust support may be included as required.

The upper end of lever segment 72 is pivoted to cylinder 56 by pivot pin 60. The lower end of lever segment 72 is welded to the inner end of horizontal shaft 76.

The upper end of lever segment 74 is welded to the outer end of horizontal shaft 76. Its lower end mounts a bearing 78 in which is journaled shaft 36 which mounts the walking beam assembly.

Figure 5:
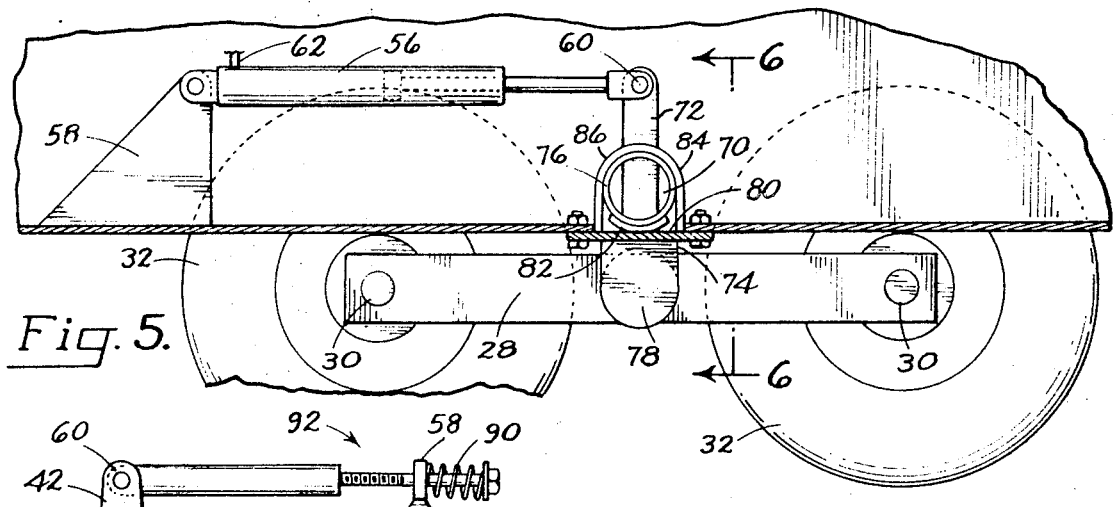
FIG. 5 is a fragmentary view in side elevation of the embodiment of FIG. 4.
Figure 6:
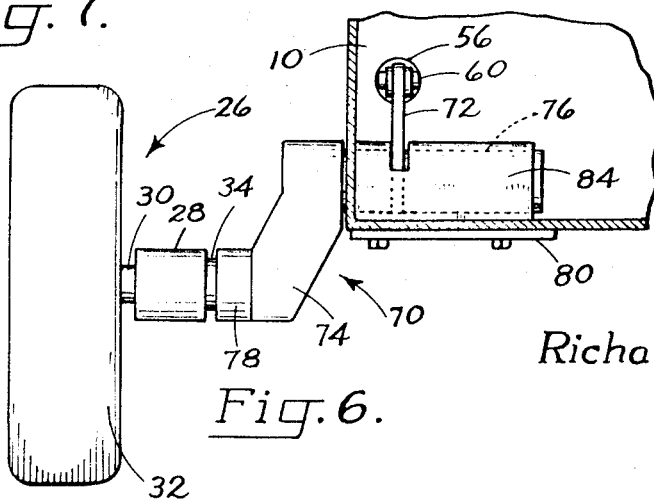
FIG. 6 is a detail transverse sectional view taken along line 6—6 of FIG. 5.

Horizontal shaft 76 is journaled in a composite bearing assembly, the construction of which is particularly evident in FIG. 5.

The floor of hull 10 is cut away to provide an opening across which is bolted a bearing support 80. The latter supports centrally on its upper surface an arcuate bearing part 82. A cooperating yoke-shaped bearing part 84 also is fixed to and supported by support 80. Bearing parts 82, 84 journal horizontal shaft 76 which interconnects the two lever segments.

Figure 7:
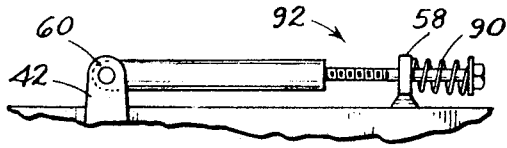
FIG. 7 is a detail view of an alternate tensioning element.

The upper surface of bearing part 84 is provided with a transverse slot 86. This receives upper lever segment 72 and permits its free angular movement. Such movement is thus transmitted to horizontal shaft 76 and thence to lower lever segment 74 which supports the walking beam assembly.

Where a fixed adjustment, or a fixed adjustment coupled with a resilient adjustment, is desired, the embodiment of FIG. 7 may be employed. In this form of the invention, a screw 92, with or without an associated spring 90, replaces cylinder 56 of the embodiment previously described. In the event of the omission of spring 90, the resiliency of the pneumatic tires of bogey wheels 32 supplies the cushioning action which otherwise would be supplied by the spring.

With either of the forms of the apparatus above described, the objects of the present invention abundantly are achieved. Fixed or running tension is applied to the track as required to maintain it in optimum working tension under all conditions of operation. The tensioning apparatus is protected, out of the way and does not become fouled with mud, water and debris, even under extreme conditions. The need for a separate tensioning wheel is eliminated since the bogey wheels which mount the track serve the supplemental functions of tensioning wheels.

Sufficient travel is provided to accommodate extremes of track length change and make possible easy removal and mounting of the tracks from and on the sprockets. Tension is applied even when the vehicle is thrown into full reverse.

These desired end results are obtained, furthermore, through the agency of a relatively simple tensioning unit easily installed and serviced, and applicable to all of the usual categories of tracked vehicles.

Having thus described my invention, I claim:

1. A track mounting and tensioning assembly for a tracked vehicle having a frame comprising:
    a. an endless track trained about a drive sprocket mounted on said vehicle frame
    b. a walking beam assembly having bogey wheels mounted thereon engaging the track,
    c. lever means,
    d. first connecting means pivotally connecting a first portion of the lever means to the frame,
    e. second connecting means pivotally connecting a second portion of the lever means to the walking beam assembly, and f. power means engaging the lever means at a point spaced from the first portion for applying a force thereto and hence to the walking beam assembly in the direction away from the drive sprocket to tension the track.

2. The track mounting and tensioning assembly of claim 1 wherein the lever means comprises an arm mounted vertically alongside the vehicle frame, an extension extending outwardly and downwardly from the arm, and bearing means mounted on the lower end of the extension and journaling the second connecting means.

3. The track mounting and tensioning assembly of claim 1 including pin and socket means arranged for releasably interengaging the lever means and vehicle frame in a predetermined position of adjustment of the lever means for applying fixed tension to the track.

4. The track mounting and tensioning assembly of claim 1 wherein the power means comprises a fluid operated cylinder.

5. The track mounting and tensioning assembly of claim 1 wherein the power means comprises an hydraulic cylinder.

6. The track mounting and tensioning assembly of claim 1 wherein the power means comprises a spring pressed hydraulic cylinder.

7. The track mounting and tensioning assembly of claim 1 wherein the power means comprises screw means.

8. The track mounting and tensioning assembly of claim 1 wherein the power means comprises spring pressed screw means.

9. A track mounting and tensioning assembly for tracked vehicles comprising:

a. an endless track trained about a drive sprocket mounted on said vehicle frame, b. a walking beam-bogey wheel assembly engaging the track, c. substantially vertically arranged lever means, d. first connecting means pivotally connecting the lever means to the frame of the vehicle intermediate the lever means ends, e. second connecting means pivotally connecting the lower end of the lever means to the walking beam intermediate the walking beam ends, and f. resilient power means mounted on the vehicle and engaging the upper end of the lever means for applying resilient pressure thereto and hence to the walking beam-bogey wheel assembly in the direction away from the drive sprocket to tension the track.

10. The track mounting and tensioning assembly of claim 9 wherein the lever means comprises a horizontal shaft extending laterally from within the frame to the exterior, an upwardly extending lever segment connected to the inner end of the shaft, a downwardly extending lever segment connected to the outer end of the shaft, coupling means coupling the resilient power means to the upper end of the first lever segment and the second connecting means to the lower end of the second lever segment, and pivotal mounting means pivotally mounting the horizontal shaft on the vehicle frame.

11. The track mounting and tensioning assembly of claim 10 wherein the pivotal mounting means comprises an arcuate bearing part underluing the shaft and a slotted bearing part overlying the shaft and securing means securing both plates to the vehicle frame, the upper lever segment penetrating the slot in the retaining plate to permit its angular movement.

* * * * *

UNITED STATES PATENT OFFICE
CERTIFICATE OF CORRECTION

Patent No. 3,744,857          Dated July 10, 1973

Inventor(s) Richard H. A. Schoonover

It is certified that error appears in the above-identified patent and that said Letters Patent are hereby corrected as shown below:

Column 4, Line 59, after "frame" insert --,--.

Column 5, Line 34, after "vehicles" insert --having a frame--.

Signed and sealed this 8th day of January 1974.

(SEAL)
Attest:

EDWARD M. FLETCHER, JR.
Attesting Officer

RENE D. TEGTMEYER
Acting Commissioner of Patents